A. ALDRITT.
HOSE SUPPORTER.
APPLICATION FILED JAN. 23, 1908.
907,216.
Patented Dec. 22, 1908.
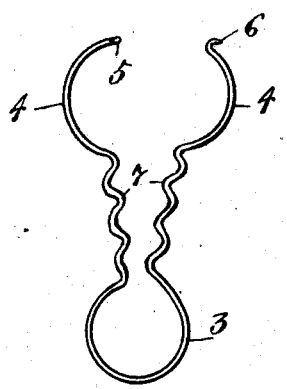
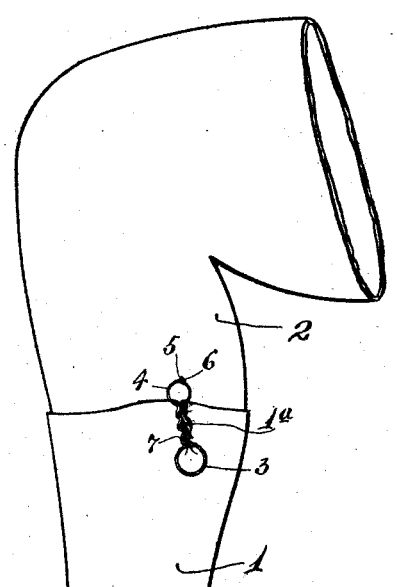
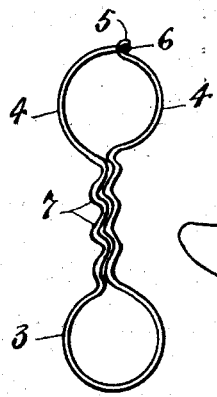
Witnesses.
Harry Opsahl.
A. H. Opsahl.
Inventor
Arthur Aldritt.
By his Attorneys
Williamson Merchant

UNITED STATES PATENT OFFICE.

ARTHUR ALDRITT, OF MINNEAPOLIS, MINNESOTA.

HOSE-SUPPORTER.

No. 907,216.      Specification of Letters Patent.      Patented Dec. 22, 1908.

Application filed January 23, 1908. Serial No. 412,238.

*To all whom it may concern:*

Be it known that I, ARTHUR ALDRITT, a citizen of the United States, residing at Minneapolis, in the county of Hennepin and State of Minnesota, have invented certain new and useful Improvements in Hose-Supporters; and I do hereby declare the following to be a full, clear, and exact description of the invention, such as will enable others skilled in the art to which it appertains to make and use the same.

My invention has for its object to provide an improved hose supporter, and to this end it consists of the novel device hereinafter described and defined in the claim.

The invention is illustrated in the accompanying drawings, wherein like characters indicate like parts throughout the several views.

Referring to the drawings, Figure 1 is a view in side elevation, showing one of my improved hose supporters applied to secure the upper portion of the hose to the leg of an under-garment; and Figs. 2 and 3 are plan views of the improved hose supporter, the former showing the supporter opened up, and the latter showing the same closed.

In Fig. 1 the numeral 1 indicates the hose and the numeral 2 the leg of an under-garment to which it is secured by one of the improved hose supporters.

The improved hose supporter is made from a single piece of spring wire, preferably tempered steel wire, the intermediate portion of which is bent to form a loop 3 and the end portions of which are bent to form semi-loops or bulged portions 4, the extreme ends of the said wire being bent to form interlocking hooks 5 and 6. Between the loop 3 and bulged portions 4 the legs of the wire are bent into zig zag or fluted form, as indicated at 7, so as to form a zig zag channel in which an interlapping fold of the hose and under-garment are adapted to be clamped, as shown in Fig. 1.

To apply the hose supporter, a fold 1ª, including an upper portion of the hose and an overlapped portion of the under-garment, is pinched together and forced slightly outward and then the hose supporter, while opened as shown in Fig. 2, is placed straddle of this fold and then pinched together and locked onto the fold, by engagement of its hooked ends 5 and 6, as best shown in Fig. 3. There will, of course, be sufficient spring in the prongs or legs of the supporter to permit the supporter to adapt itself to folds of different thickness; and the said spring wire, from which the supporter is made, should have such strength as to tightly clamp the zig zag or fluted portion 6 thereof tightly onto the fold of the hose and under-garment. The zig zag or fluted form of the clamping portion 7 not only decreases the liability of the holder to slip endwise on the fold, but distributes the clamping strain to a number of different points and very greatly increases the bite of the holder on the said fold.

As is evident, the supporter may be very quickly applied in working position or removed therefrom. It is of very small cost and in practice has been found highly efficient for the purposes had in view.

This improved hose supporter, so-called, may, of course, be used for other purposes than that of securing the upper portion of a hose to an under-garment.

What I claim is:

A hose supporter constructed from a single piece of spring wire bent to form a spring loop 3, bulged portions 4, interlocking end hooks 5 and 6 and zig zag or fluted intermediate clamping portions 7, substantially as described.

In testimony whereof I affix my signature in presence of two witnesses.

ARTHUR ALDRITT.

Witnesses:
  H. D. KILGORE,
  F. D. MERCHANT.